Oct. 12, 1965 F. A. GUERTH 3,212,076

DATA RECORDING SYSTEM WHEREIN DATA AND REFERENCE PULSE SPACING IS CHARACTERISTIC OF THE INTELLIGENCE

Original Filed Oct. 14, 1958 3 Sheets-Sheet 1

INVENTOR.
FRITZ A. GUERTH

BY Howard J. Murray Jr. AGENT
George J. Rubens ATTORNEY

Oct. 12, 1965 F. A. GUERTH 3,212,076

DATA RECORDING SYSTEM WHEREIN DATA AND REFERENCE PULSE SPACING IS CHARACTERISTIC OF THE INTELLIGENCE

Original Filed Oct. 14, 1958 3 Sheets-Sheet 2

INVENTOR.
FRITZ A. GUERTH

BY Howard J. Murray Jr. AGENT
George J. Rubens ATTORNEY

INVENTOR.
FRITZ A. GUERTH
BY Harold J. Murray Jr. AGENT
George J. Rubens ATTORNEY United States Patent Office 3,212,076

Patented Oct. 12, 1965

3,212,076
DATA RECORDING SYSTEM WHEREIN DATA AND REFERENCE PULSE SPACING IS CHARACTERISTIC OF THE INTELLIGENCE

Fritz A. Guerth, 50 Lori Road, Camarillo, Calif.

Original application Oct. 14, 1958, Ser. No. 767,239. Divided and this application May 8, 1962, Ser. No. 193,344
5 Claims. (Cl. 340—174.1)
(Granted under Title 35, U.S. Code (1952), sec. 266)

The invention described herein may be manufactured and used by or for the Government of the United States of America for governmental purposes without the payment of any royalties thereon or therefor.

The present invention relates in general to the recording of intelligence, and constitutes a division of application Serial No. 767,239 filed October 14, 1958 now abandoned. In one of its aspects, the invention is directed to the recordation on a moving tape of a series of regularly recurring reference pulses or markers of extremely short duration, together with a series of data pulses of similar form, each data pulse being spaced on a time scale from its associated reference pulse in accordance with a characteristic of the intelligence at the instance the particular data pulse is recorded.

So-called pulse-position-modulation (PPM) systems have been widely used for the transmission of signals within a limited band of frequencies. In such systems, variations in the values of successive samples of a modulating wave are represented by a shift in the position of a pulse along a time axis, so that the position of any particular pulse is indicative of the value of the modulating signal at the time of occurence of that pulse. Since a PPM system of this nature is a constant-amplitude method of transmission, any interference present may be largely removed by limiting and/or clipping, resulting in an excellent over-all signal-to-noise ratio, as well as very satisfactory reproduction characteristics.

The art of recording data on sensitized tape by means of a varying magnetic field has received much attention in recent years, resulting not only in a wider reproducible frequency range but also in more efficient utilization of the available tape surface. The number of different channels which may be recorded simultaneously has also been increased by dividing the sensitized tape into narrow bands extending in its direction of movement, with each such band representing a separate item of information such, for example, as one condition of the operation or environment of a guided missile or satellite.

However, three features of such a recording system act to limit the extent of its use. First, the number of channels is obviously restricted by the width of the tape, with at least a minimum separation distance between bands being necessary to avoid inter-channel cross talk. Secondly, when information of analog form is being recorded, the tape cannot pass by the recording head below a minimum speed without introducing objectionable distortion into the reproduced intelligence. This reduces the overall recording time, or, conversely, increases the length of tape used during a given period. Thirdly, even slight variations in tape speed during recording and/or reproduction cannot be tolerated, necessitating extremely precise operation of the tape driving mechanism.

The present invention overcomes all of the above disadvantages. In accordance with a feature thereof, data to be recorded is represented by pulses of very short time duration, each of these pulses being spaced (as in PPM systems) from a regularly recurring indexing pulse or marker by a distance which is representative of the intelligence to be reproduced. By correlating the recording operation with the rate of tape movement, the spacing between successive marker pulses becomes independent of tape speed variations, and, since the data pulses are preferably obtained by a periodic sampling of the original intelligence at a predetermined frequency relationship, there is no restriction placed on minimum tape speed except that necessary to preclude actual overlapping or superimposition of successive pulses in a given channel. The invention in a further embodiment embraces the use of the entire width of the tape to record pulses representative of data in each channel, this being achieved by establishing a particular angular relationship of the respective pulses in each channel with respect to the longitudinal axis of the tape, such angular relationship being different for each channel and remaining constant throughout both the recording and reproducing operations.

One object of the present invention, therefore, is to provide an improved form of data recording and reproducing system.

Another object of the invention is to provide a system in which pulse energy is applied to a slowly moving tape by means of a recording head having a gap of extremely narrow dimensions, such that the electromagnetic impression formed by each pulse on the tape is, in effect, a pictorial representation of the gap itself.

A further object of the invention is to provide a system of magnetic tape recording in which data is represented by variations in pulse position with respect to a regularly recurring indexing pulse or marker, and in which a plurality of channels of information may be recorded within the same general tape area through an angular variation in the relationship of the pulses respectively associated with such channels.

A still further object of the invention is to increase the number of channels of information that may be recorded on a given area of sensitized tape or other storage medium.

An additional object of the invention is to facilitate the reading out of information that has been electromagnetically recorded on a tape by producing a cyclically varying displacement, or oscillation, of the tape relative to the read-out head, this relative movement acting in effect to scan a selected tape area and thus permit a prolonged inspection thereof.

A still further object of the invention is to provide for an automatic evaluation of recorded data through means which determines the spatial relationship between the reference markers and the data pulses and presents such information in a form that may be readily utilized by an observer.

Other objects and many of the attendant advantages of this invention will be readily appreciated as the same becomes better understood by reference to the following detailed description when considered in connection with the accompanying drawings wherein:

FIG. 1 is a partially schematic illustration of a preferred form of data recording system embodying the principles of the present invention;

FIGS. 2(*a*) and (*b*) depict the relationships between recording gap width, tape impression or pattern, and read-out pulses, and are drawn to provide a comparison between the operation of recording arrangements of the prior art and one recording system of the present invention, respectively;

The concept herein disclosed is particularly, but not exclusively, intended for use in order to provide a permanent record of the position condition of one or more movable elements that are remotely or inaccessibly located such that direct visual observation thereof is either impractible or impossible. The invention is especially directed to the recordation of data that varies relatively slowly with respect to time, such conditions being found, for example, in the measurement of temperatures developed in various portions of a guided missile or satellite following the launching thereof, or in the measurement of slight departures in speed of rotation of a shaft with respect to a normal or reference value. In many instances, the information so recorded (and subsequently telemetered or otherwise made available for observation and study by technical personnel) provides the only clue as to the cause of failure of the particular component under observation, and serves as a guide to the corrective measures that should be taken to avoid a recurrence of the malfunctioning in later designs.

Figure 1:
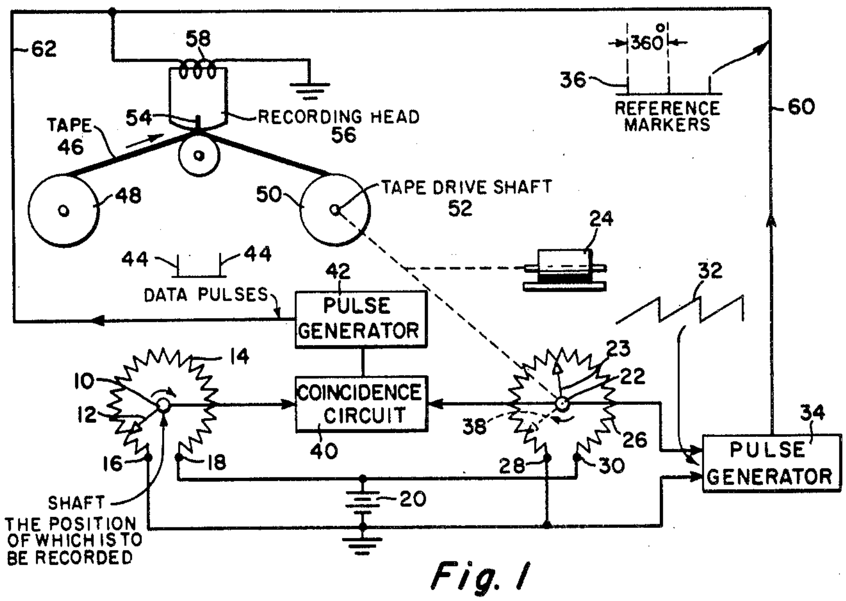

As an illustration, let it be assumed that a shaft 10 of FIG. 1 represents the pivot element of a condition-responsive device such as a temperature-recording instrument associated with some particular component of a pilotless aircraft. Information is desired as to the variations in temperature experienced by this component under actual flight conditions, such information to be recorded in permanent form for subsequent evaluation and/or analysis.

Shaft 10, therefore, carries a rotatable wiper contact 12 forming part of a potentiometer which includes the annular resistance element 14. This wiper contact 12 is designed to represent (in a positional sense) the indicator of a conventional dial-type thermometer intended for visual observation, the annular resistance element 14 corresponding to the calibrated thermometer dial in that any particular location of wiper 12 (such, for example, as the one illustrated in the drawing) represents one particular value of temperature of the component being monitored. An increase in the temperature of such component will cause a rotation of shaft 10 and hence wiper 12, this rotation being, for example, clockwise or in the direction of the arrow.

The annular resistance element 14 is not continuous, but is split or separated to form two terminal connections 16 and 18. The former is grounded as shown, while the latter is connected to the positive terminal of a source of potential such as the battery 20. Clockwise rotation of wiper 12 thus causes it to successively contact points on element 14 having an increasing voltage characteristic.

A second potentiometer is also illustrated in FIG. 1, this unit being identical in all respects to that formed by the elements 12 and 14 except that the shaft 22 on which the wiper 23 of such second potentiometer is mounted is driven by a motor 24. The resistance element 26 of the second potentiometer unit has two terminals 28 and 30 corresponding to terminals 16 and 18, respectively, of the first-mentioned potentiometer assembly, and connected to the same battery 20.

As the wiper contact 23 rotates, the voltage picked off thereby from the resistance element 26 increases from zero at terminal 28 to a maximum at terminal 30. At the latter point, it drops sharply to zero, whereupon another cycle is initiated. The actual gap or spacing between both terminals 16 and 18 and terminals 28 and 30 is exaggerated in the drawing for the sake of clarity of illustration. The output voltage developed between terminal 28 and wiper 23 is represented by the waveform 32, the latter being of generally saw-tooth configuration with relatively sharp trailing edges. As will later become apparent, linearity of the rising portion of each voltage cycle is not critical as long as the two resistance elements 14 and 26 possess similar electrical characteristics.

The varying voltage 32 is applied to a generator 34 which operates to produce a series of sharp output pulses 36 during the "flyback" periods of the input wave. These pulses 36, hereinafter termed "reference markers," are representative of the passage of the wiper 23 from terminal 30 to terminal 28, or from a voltage maximum to zero. Expressed in terms of angular rotation of shaft 22, the pulses or markers 36 are indicative of changes in the position of wiper arm 23 from 360 degrees to 0 degrees. Each pulse 36, therefore, may be considered as representing the time instant at which the wiper arm 23 starts at terminal 28 to progress around the periphery of the resistance element 26.

At some point in this journey, the wiper arm 23 will occupy a position which coincides in an angular sense with the position occupied by the wiper arm 12 carried by the shaft 10. This position is indicated in the drawing by the broken line 38. At the time instant when the two wiper arms 12 and 23 are in angular coincidence, the voltage picked up thereby from their respective resistance elements 14 and 26 will be equal.

These two voltages are applied to a coincidence circuit 40 which is effective to trigger a second generator 42 acting to develop a pulse 44 for each occasion in which equal voltages from the wiper arms 12 and 23 are received by the coincidence circuit 40.

It will now be appreciated that, as the wiper arm 23 rotates, a pulse will be produced at the initiation of each sweep cycle (in other words, at terminal location 28) and also at that point where the wiper 23 is in an angular position similar to the position occupied by wiper 12 during that particular cycle of operation. The latter pulses, however, will vary in position (or time displacement) relative to the reference pulses as the position of wiper arm 12 changes to reflect a rotation of shaft 10 in response to variations in temperature of the component being monitored.

Also shown in FIG. 1 is a magnetic recording medium, such as a sensitized tape 46, which is unwound from a storage reel 48 onto a take-up reel 50. The latter is carried on a shaft 52 preferably driven by the same motor 24 which rotates the potentiometer wiper arm shaft 22, these two shafts being interconnected by a gear train (not shown) having a preset ratio, or otherwise positively synchronized so that no slippage or angular displacement can occur therebetween.

Figure 2:
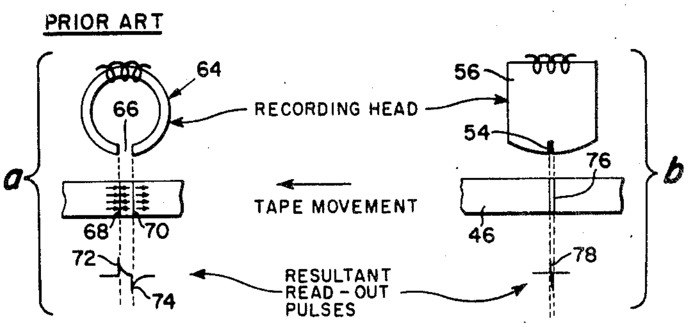

Tape 46 moves across a gap 54 in a recording head 56, the design of this gap being more fully brought out in connection with a description of FIG. 2. The head 56 is energized in more or less conventional fashion by a coil 58. The reference pulses or markers 36 from generator 34 are applied to coil 58 over conductor 60, while the data pulses 44 from generator 42 are also applied to coil 58 over conductor 62.

In presently known recording systems, the width of the gap formed in the recording head has in most cases not been considered critical in its minimum dimension, due primarily to the nature of the information which has been recorded and also to the high speed of movement of the tape across the gap. For example, in the recordation of voltage pulses of rectangular form, the fact that each such voltage pulse creates two distinct electromagnetic impressions on the sensitized tape is of no particular consequence when conventional tape speeds in the order of 10 to 15 inches per second are employed. However, such operation is extremely wasteful of tape surface and obviously cuts down on available recording time. FIG. 2(*a*) illustrates a conventional recording head 64 having a gap 66 of standard dimensions. This gap creates a magnetic pattern on the tape (as indicated by the arrows) such that both the impressions 68 and 70 can readily be resolved by the reproducing circuitry to result in two distinct output impulses 72 and 74 extending in different directions of polarity.

In applicant's system, however ,the recording head is so designed that the gap therein is extremely narrow. Operation is then as shown in FIG. 2(*b*). An applied pulse of, say 10 microseconds duration produces in effect but a single electromagnetic impression 76 which is essentially normal to the tape axis. This single tape impression, when read out, results in but a single pulse 78, since the width of the recording gap 54, and hence the width of tape impression 76, is no narrow that even though the latter may actually be made up of two separate distributional patterns of the sensitized particles with which the tape is coated, these distributional characteristics cannot be resolved by conventional circuit components.

With respect to the tape speed, if the width of gap 54 is chosen to be .0002 inch (representing 5,000 gap widths or lines per inch of tape surface) then the application of input pulses of 10 microseconds duration will permit a tape movement of as little as 5 centimeters per second, if loss of definition is limited to 1 percent of the gap width. In fact, it has been found in practice that when using a gap of .001 inch, a tape speed as low as 2 millimeters per second clearly resolves the on-and-off of an applied pulse of 10 microseconds duration.

Figure 3:
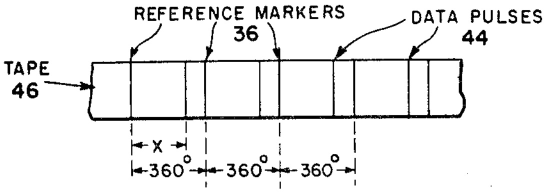
FIG. 3 is a section of tape showing somewhat schematically the relative position of a series of reference markers and data pulses such as might be recorded thereon by the system of FIG. 1.

FIG. 3 illustrates a section of tape such as would be produced by operation of the system of FIG. 1. The reference pulses or markers 36 indicate the initiation of each operational cycle, while the distance of each data pulse 44 from its associated reference marker is an indication of the angular position of the wiper arm 12 expressed as a percentage of 360 degrees.

It should be noted that the present system is in effect a ratio form of measurement. Hence, stretching or shrinking of the tape (or other recording medium) is of no significance and, furthermore, since the pulse-generating apparatus is operationally synchronized with the tape driving components, the output is completely unaffected by variations in speed of recording or play back. In other words, pulse spacing is governed by the same conditions that govern speed of tape movement through a direct mechanical interrelationship between these two factors.

Figure 4:
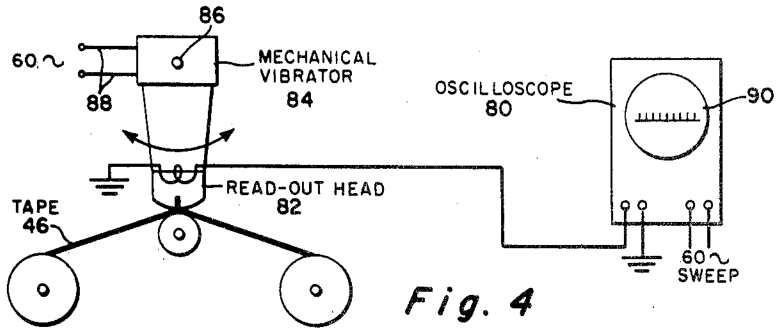
FIG. 4 is a form of visual read-out system employing a mechanical vibrator for steady-state presentation.

Several forms of playback apparatus are illustratively disclosed for reading out the information recorded by the system of FIG. 1. For example, FIG. 4 illustrates an assembly especially designed for visually presenting the recorded pulses on an oscilloscope 80. In order to permit minute and protracted inspection and/or analysis of a selected pulse or group of pulses, a section of the tape 46 in front of playback head 82 is periodically scanned at a frequency, such as 60 cycles per second, which is the same as the sweep frequency of the oscilloscope 80. This scanning of the tape 46 by developing a relative oscillatory displacement between the tape and read-out head may be effected either by the combination of a movable head and stationary tape, as in FIG. 4, or by a stationary head and an oscillatable tape, as in FIG. 5.

In the former arrangement, the read-out head 82 is connected to a mechanical vibrator 84 which is pivoted at 86 in order to produce an oscillatory motion of head 82 in the direction of the arrows when energized by an alternating voltage applied to terminals 88. Tape 46 is preferably stationary or subject only to movement by hand during this operation. A pictorial representation of the pulse arrangement on the portion of tape 46 scanned by the read-out head 82 appears on the screen 90 of oscilloscope 80, the pulses being stationary as presented due to the identity between the alternating voltage applied to the vibrator input terminals 88 and the horizontal deflection or sweep voltage applied to oscilloscope 80.

Figures 5, 6:
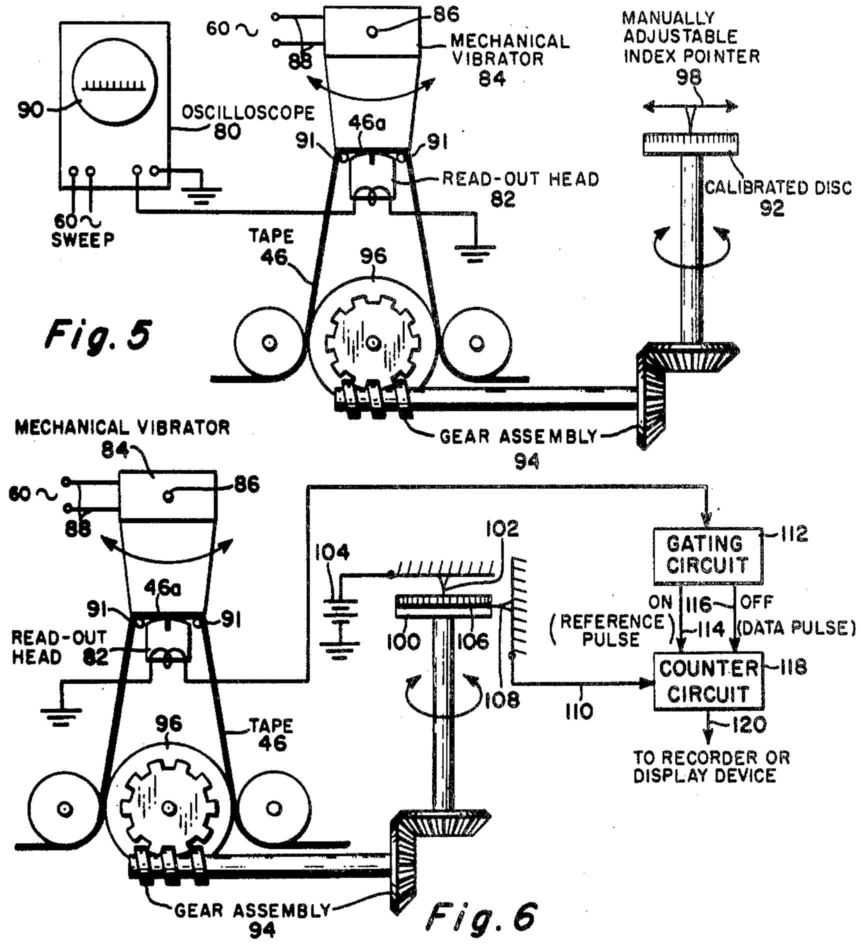
FIG. 5 is a visual read-out system such as shown in FIG. 4, with the addition of manually operable means for obtaining an indication as to pulse spacing.
FIG. 6 is an automatic version of the manually operable data-acquisition system of FIG. 5.

If desired, the read-out head 82 of FIG. 4 (which may be similar in all respects to the recording head 56 of FIG. 1) may be maintained stationary, as illustrated in FIG. 5, while the tape 46 has an oscillatory motion imparted thereto by passing it over a pair of rollers 91 which are carried by the mechanical vibrator 84. The tape portion **46*a* between the rollers 91 then undergoes the same oscillatory motion (about the pivot point 86 in the direction of the arrows) as that of the read-out head 82** in the embodiment of FIG. 4. It should be emphasized that the relative motion between the tape and read-out head is identical in both FIGS. 4 and 5, only the arrangement for producing such relative motion being modified.

FIG. 5 sets forth, in addition to the above, means for visually determining the exact displacement of a data pulse as recorded on tape 46 from its associated reference pulse or marker. It will be recalled that successive reference markers 36 are 360 degrees apart, as indicated in FIG. 3, and that the displacement or spacing therefrom of any selected data pulse 44 is indicative of the value of the information being instantaneously presented. Consequently, in order to obtain this displacement or spacing (identified as $x$ in FIG. 3) expressed in specific terms, such as degrees of rotation of shaft 10 (FIG. 1) or degrees of component temperature into which such shaft rotation may be translated, a disc 92 is provided which is calibrated in the terms desired. For example, this disc 92 may be so arranged that one complete rotation thereof corresponds to the spacing between adjacent reference markers 36 on the tape 46 of FIG. 3. In such a case, disc 92 would be connected through a gear assembly 94 to some portion of the tape driving mechanism, such as the roller 96. The gear ratio of assembly 94, in the example being given, is so selected that the disc 92 undergoes one complete rotation of 360 degrees for each movement of the tape 46 (caused by rotation of roller 96) sufficient to change the alignment of the gap in head 82 from one reference marker 36 to the next. In practice the tape 46 is moved (preferably manually) to a position where one selected reference marker 36 yields maximum output as observed on the screen 90 of oscilloscope 80.

The manually adjustable index pointer 98 is then set so that it coincides with the zero scale reading on disc 92. Tape 46 is now moved manually to a position where the data pulse 44 associated with the selected reference marker yields a maximum output (or, in other words, the tape is moved throughout the distance $x$ of FIG. 3) and the number of degrees of rotation of disc 92 is shown by the index pointer 98. For the position of wiper 12 in FIG. 1, such a reading might be in the neighborhood of 45 degrees, or, alternatively, the corresponding value on a temperature scale.

The arrangements of FIGS. 4 and 5 require that the operator manually control the movement of tape 46 from one position to another in order to obtain the information desired on the screen of oscilloscope 80. If it is preferred to have the recorded data presented without such manual attention, the system of FIG. 6 may be utilized. The apparatus of this embodiment is in many respects similar to that of FIG. 5, except that oscilloscope 80 is omitted and the calibrated disc 92 (which is intended for visual observation) replaced by a disc 100 forming a part of an electrical circuit.

Disc 100 is designed for rotation as a function of rotation of roller 96 in the same manner as the disc 92 of FIG. 5—that is, through the gear assembly 94. However, the manually adjustable index pointer 98 of the latter figure is replaced by a fixed pointer 102 of an electrically conductive nature, this pointer being connected to one terminal of a battery or other source of potential 104 the other terminal of which is grounded as shown.

Each "calibration" of disc 100 (of which there would be 360 in the illustration given) is in the form of a thin wire or conductor embedded in the insulating material of which disc 100 is composed. These wires or conductors successively contact the fixed pointer 102 as the disc 100 rotates. Each of these conductive calibrations of the disc 100 is electrically joined to an annular ring 106 of metal or other conductive substance which is in constant electrical engagement with a stationary pick-off terminal 108. Consequently, as the disc 100 rotates, a pulse is produced in the lead 110 each time that one of these conductive calibrations of the disc makes electrical contact with pointer 102.

Also shown in FIG. 6 is a gating circuit 112 connected to receive the output of the playback head 82. This gating circuit, which may be of known design, is of the "on-off" type and operates to generate an on voltage variation in output conductor 114 each time that a reference marker 36 is supplied thereto from the playback head 82, and an off voltage variation in output conductor 116 each time that a data pulse 44 is supplied thereto by movement of tape 46 past the playback head 82.

The on and off voltage variations from gating circuit 112 are applied to an electronic counter 118 which also receives the calibration pulses developed in conductor 110 by rotation of disc 100. The latter are constantly being developed during continuous movement of tape 46 past the readout head 82, 360 of such pulses being produced during each recording cycle as represented by the spacing between successive reference markers 36.

Gating circuit 112 supplies an on pulse to condition the counter 118 for operation each time that a reference marker 36 passes by the gap in head 82. Counter 118 then passes the calibration pulses to an output lead 120 until such time as it receives an off signal over lead 116. The latter occurs when a data pulse 44 passes by the gap in head 82. The number of such calibration pulses supplied to output conductor 120 between the on and off signals from gating circuit 112 is an indication of the distance $x$ in FIG. 3, and may be recorded or displayed in any desired manner. It should be mentioned that it is unnecessary to operate the vibrator 84 during automatic data presentation by the circuit of FIG. 6. However, since the disc assemblies 92–98 and 100–102 may be of interchangeable design for alternative use, vibrator 84 may be present at all times and energized only when required.

It is also not necessary that the data read-out in the systems of FIGS. 4, 5, and 6 be presented in visual form or directly re-recorded. If preferred, known arrangements may be employed in which such data is caused to appear on a typed or punched medium. Furthermore, continuous read-out is possible by utilizing conventional stroboscopic techniques to photographically record readings on the calibrated disc 92 of FIG. 5 through exposure of constant-velocity film.

The preceding description has been directed to the use of a storage medium for recording a single item of information which is subject to variations in magnitude. However, the ratio concept of measurement on which the present invention is based makes the disclosed system particularly suitable for so-called multi-channel recording, in which the same general region of the storage medium is utilized to record a plurality of signals representing independent aspects of the operation of some unitary assembly. In such cases, it is obvious that interchannel interference should be at a minimum. Nevertheless, the limited tape area available in conventional systems employing separate longitudinal signal tracks frequently results in an objectionable level of cross talk unless extensive precautions are observed, such as an increase in the separation distance between bands. This obviously reduces the number of channels that may be recorded on tape of given dimensions.

It has been found that when a narrow electromagnetic impression is made on a tape by a recording head having a very narrow gap, the fact that this recorded impression is, in effect, a picture of the gap itself makes the impression capable of being read out only by a head having a gap angularly oriented in exactly the same manner as the gap of the recording head. This circumstance makes possible the recordation of a plurality of separate channels of information within the same general tape region by angularly displacing the parallel axes of the pulses in any one particular channel with respect to the respective axes of the pulses in each of the remaining channels.

Figure 7:
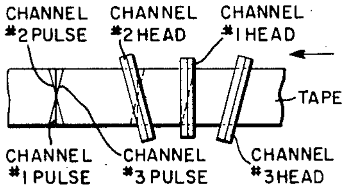
FIG. 7 illustrates the recording of data in a plurality of channels by means of a corresponding number of fixed recording heads each of which is angularly displaced with respect to the remaining heads in the direction of tape movement.

FIG. 7 illustrates the above principle. The recording and/or playback head for channel No. 1 has a gap which may be effectively normal to the longitudinal axis of the tape, this position corresponding to that of the gap in head 56 of FIG. 1 or the gap in head 82 of FIGS. 4, 5 and 6. It therefore produces a tape impression of similar orientation, as depicted in the left-hand portion of FIG. 7. To now record information in another channel and subsequently read out this information, a second head is provided the gap of which is angularly displaced with respect to that of head No. 1. If required, still another head may be utilized the gap of which is angularly offset with respect to those of both heads Nos. 1 and 2. It should be particularly noted that the pulses of all three channels are, in effect, superimposed one upon the other, the actual crossover area of the pulses being extremely small in comparison to their total length. Thus, if a particular head has a gap disposed to read out a pulse having a specific orientation, this head will be almost completely unresponsive to the electromagnetic energy in all other pulses which are angularly offset in any direction and by greater than a minimum amount with respect to the specific pulse in question. It can be shown mathematically, and in fact has been determined by actual experimentation, that an angular separation of two degrees between adjacent channel pulses is sufficient to permit 50 percent recovery of the recorded information. The clipping level is of course chosen to eliminate as far as practicable all spurious noise and inter-pulse modulation which might interfere with the recovery process.

Figure 8:
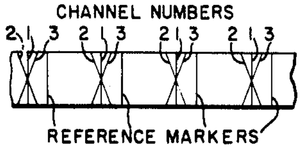
FIG. 8 illustrates a series of pulses such as might be recorded by the arrangement of FIG. 7.

FIG. 8 illustrates the manner in which three separate channels of information may be simultaneously recorded on a tape by three separate heads positionally disposed in the manner of FIG. 7. The general relationship of data pulses and reference markers is identical to that of FIG. 3. It will be recognized that the dimensions and angular separation between pulses have been exaggerated in the drawing for ease of illustration, and that the number of channels which may be accommodated on a single tape is limited only by physical limitations on the narrowness of the gap that may be formed in the recording head and by the sensitivity of the associated electrical circuitry. With apparatus as herein set forth, the simultaneous recordation of approximately 100 separate channels of information may be readily accomplished.

Figure 9:
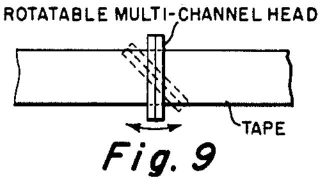
FIG. 9 illustrates the manner in which a single read-out head may be selectively rotated in order to obtain data from any particular one of the channels recorded on the tape of FIG. 8.

If it is desired to read out but a single channel at any one time, a single read-out head may be utilized which is selectively rotatable. Such a head is shown in FIG. 9. This member is brought into alignment with the axis of the pulses in the particular channel of interest by selective movement thereof in the direction of the arrows. This simplifies the read-out assembly by permitting all of the remaining heads to be dispensed with in cases where the same apparatus is not used for both recording and playback.

It will now be appreciated that the disclosed system is capable of concentrating data to a degree not hitherto possible, and hence is particularly suitable for use in circumstances where prolonged periods of recording must be made without interruption. Conditions of this nature may be encountered, for example, aboard long-flight missiles, or in remote ground areas which must remain unattended for considerable periods of time.

Obviously many modifications and variations of the present invention are possible in the light of the above teachings. It is therefore to be understood that within the scope of the appended claims the invention may be practiced otherwise than as specifically described.

I claim:

1. In a device of the class described, a component one condition of which is subject to change, means for developing a first voltage indicative of the instantaneous condition of said component, means for developing a second voltage which varies cyclically over a range which includes said first voltage, first circuit means for developing a reference pulse at the same point in each cycle of said second voltage, further circuit means for developing a data pulse whenever said first and second voltages are in coincidence, a storage medium, and means for recording on said storage medium both the reference and data pulses developed by said circuit means, said storage medium acting to provide an indication of the changing condition of said component through a variation in the time displacement of successive data pulses from the reference pulses respectively associated therewith.

2. A recording system designed to produce on a moving tape a series of constant-area magnetic impressions the longitudinal position of which is indicative of the intelligence represented thereby, said system including a first shaft the varying angular position of which is to be recorded, means for developing a voltage the amplitude of which is indicative of the angular position of said first shaft, a second rotatable shaft, means for developing as a function of the cyclic rotation of said second shaft a varying voltage the range of which includes the voltage developed to indicate the angular position of said first shaft, first circuit means for generating a voltage pulse at the same relative point in each cycle of rotation of said second shaft, further circuit means for generating another voltage pulse during each cycle of rotation of said second shaft whenever the voltage developed to indicate the angular position of said first shaft is equal to the voltage developed during the cyclic rotation of said second shaft, means for driving said tape as a function of the rotation of said second shaft, and means for producing on said tape a series of constant-area impressions indicative of the time of occurrance of the pulses respectively generated by said two circuit means.

3. A recording system according to claim 2, in which each of said voltage-developing means includes an annular potentiometer the rotatable contact of which is actuated by its associated shaft.

4. The combination of claim 3, in which said potentiometers have substantially identical electrical characteristics and are each energized from a common source of potential.

5. The method of recording a change in status of an element in cases where such change may be represented by a variation in signal energy, said method including the steps of developing a regularly-recurring cyclic energy variation independent of the status of said element, recording the time instant when each such cyclic energy variation is initiated, and then further recording the time instant at which the magnitude of each such cyclic energy variation equals the magnitude of the signal energy representing the status of said element.

References Cited by the Examiner

UNITED STATES PATENTS

| | | | |
|---|---|---|---|
| 2,307,077 | 1/43 | Reagan | 317—155.5 |
| 2,321,605 | 6/43 | Keinath | 346—33 |
| 2,712,572 | 7/55 | Roberts | 340—174.1 |
| 2,937,239 | 5/60 | Garber et al. | 346—74 |
| 2,992,417 | 7/61 | Hoefs et al. | 346—74 |

IRVING L. SRAGOW, *Primary Examiner.*

ROBERT SEGAL, *Examiner.*